S. T. W. Potter.
Ditching Plow.
N° 35,890. Patented July 15, 1862.
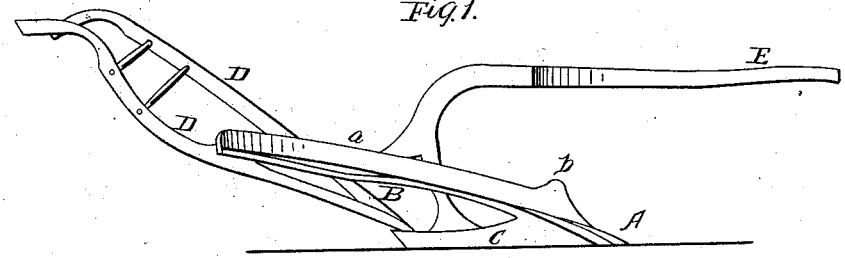
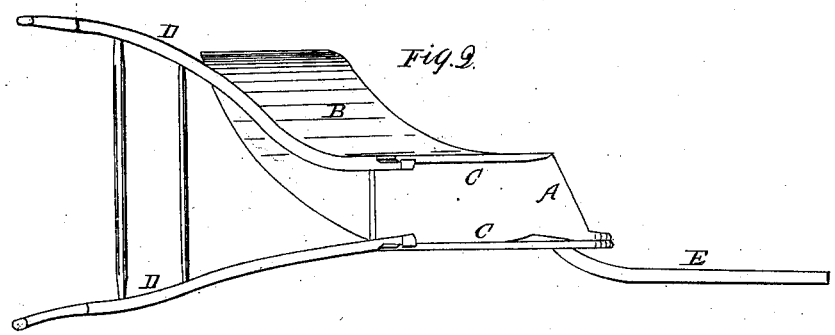
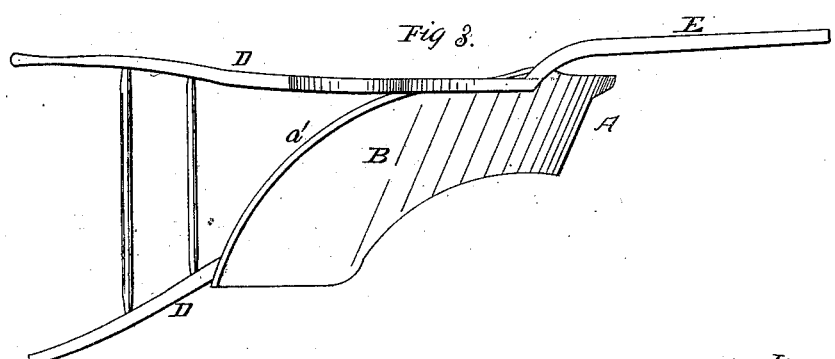

UNITED STATES PATENT OFFICE.

S. T. W. POTTER, OF SCOTT, NEW YORK.

IMPROVED SUBSOIL-PLOW.

Specification forming part of Letters Patent No. 35,890, dated July 15, 1862.

*To all whom it may concern:*

Be it known that I, S. T. W. POTTER, of Scott, in the county of Cortland and State of New York, have invented a new and Improved Subsoil-Plow; and I do hereby declare that the following is a full, clear, and exact description of the same, reference being had to the accompanying drawings, making a part of this specification, in which—

Figure 1 is a side elevation of my invention; Fig. 2, an inverted plan of the same; Fig. 3, a plan or top view of the same.

Similar letters of reference indicate corresponding parts in the several figures.

This invention consists in constructing the mold-board of the plow in the form of a curved inclined plane with a guard at its landside edge, as hereinafter fully shown and described, whereby the plow, as it is drawn along in the furrow previously made by a surface-plow, will take up the subsoil and deposit it on the furrow-slice turned by the surface-plow, so that the field, when plowed, will have the subsoil brought to the surface for subsequent tillage.

To enable those skilled in the art to fully understand and construct my invention, I will proceed to describe it.

A represents the share of the plow, and B the mold-board. These two parts may be of nearly equal width, the mold-board very gradually inclining a little from its front to its back end, as shown in Fig. 3. The share and mold-board, in their horizontal section, are in a horizontal plane; but longitudinally they are in an inclined plane, as shown in Fig. 1, and curved to form a portion of a circle, as shown in Figs. 2 and 3. This curvature of the mold-board is such that its outer or back end will, when the plow is in operation, project over the furrow slice previously turned by an ordinary surface plow, and the share and lower part of the mold-board are of such a width as to admit of their working in the furrow made by the surface-plow.

The inner or land side of the mold-board B is provided with a vertical ledge or guard, *a*, which extends down nearly to the point of the share, and the front end of said ledge or guard may project up a trifle higher than at any other point and have an inclined sharp edge at its front to form a cutter, *b*, as shown in Fig. 1.

C C represent two parallel bars, which are connected to or cast with the share and project horizontally from its under side. To the back ends of these bars the lower ends of the handles D D of the plow are attached, and the back end of the mold-board B rests on one of the handles.

E is the beam of the plow, which is secured to one of the bars C, the left-hand side of the mold-board B, and to one of the handles D. This beam is curved, as shown clearly in Figs. 2 and 3, in order that the line of draft may have a proper relative position with the share and mold-board.

The operation of the plow will be very readily seen. As the implement is drawn along in the furrow previously made by an ordinary surface-plow the share A will penetrate the subsoil, and the latter is forced up on the mold-board B and deposited by the latter on the furrow-slice turned by the surface-plow. The ledge or guard *a* prevents the subsoil from passing off at the left-hand side of the mold-board.

By means of the inclined mold-board and share, curved as shown, the subsoil is conveyed to the surface and deposited thereon with but a light draft, as the friction of the earth in passing over the share and mold-board is not very great.

The plow also may be constructed at a very moderate expense.

Having thus described my invention, what I claim as new, and desire to secure by Letters Patent, is—

The inclined curved mold-board and share, provided with the ledge or guard, arranged substantially as and for the purpose herein shown and described.

S. T. W. POTTER.

Witnesses:
H. L. BABCOCK,
WM. N. BABCOCK.